United States Patent [19]

Jeong

[11] 4,435,867

[45] Mar. 13, 1984

[54] DEVICE FOR GATHERING THE POLLEN FROM A BEE

[76] Inventor: Tae S. Jeong, 1184, Hwanghak-dong, Jung-ku, Seoul, Rep. of Korea

[21] Appl. No.: 369,663

[22] Filed: Apr. 19, 1982

[51] Int. Cl.³ .................... A01K 47/06; B32B 3/10
[52] U.S. Cl. ................................. 6/4 R; 428/134; 428/255
[58] Field of Search ............. 6/1, 4 R; 428/134, 255, 428/256; 160/17

[56] References Cited

U.S. PATENT DOCUMENTS

| | | | |
|---|---|---|---|
| 898,281 | 9/1908 | Stein | 160/17 X |
| 1,636,635 | 7/1927 | Holmes | 6/4 B |
| 2,294,966 | 9/1942 | Dreyfus | 428/256 X |
| 3,995,338 | 12/1976 | Kauffeld | 6/12 M X |

Primary Examiner—Robert P. Swiatek
Attorney, Agent, or Firm—Darby & Darby

[57] ABSTRACT

A pollen collector for bees in which the entranceway into the hive is formed with a plurality of openings; the openings having a narrow lower portion through which the legs of the bees pass, and an enlarged upper portion through which the body and abdomen pass. As the legs pass through the narrow lower portion, contact is made with the entranceway and the pollen is rubbed off while the body of the bee freely passes through the enlarged upper section.

9 Claims, 3 Drawing Figures

DEVICE FOR GATHERING THE POLLEN FROM A BEE

BRIEF EXPLANATION OF INVENTION

This invention relates to an improvement of a device for gathering pollen from a bee. More particularly, this invention relates to the entrance of the bee into the beehive such that when, or just before, the bee having the pollen on the legs enters into the beehive, the pollen is removed from the legs of the bee and the bee can pass away swiftly the entrance without receiving a wound around its wings, legs or abdomen.

BACKGROUND OF THE ART

According to the prior art, in order to collect the pollen from bees, the beehive has a collector at the entrance is in the form of one or two sheets of the screen plate forming a series of round or square shapes through which the bee enters. When the bee enters into the beehive through such an entrance, the pollen attached to the legs of the bee falls from the legs on the outer circumference of the entrance. However, when the bee passes through the entrance, the head and the front legs pass through first and the abdomen and the rear legs thereafter pass, sometimes causing a rubbing of the wings. Thus, when the bee passes through the entrance, it takes time and the wings or abdomen of the bee may be wounded or injured by the surrounding portion of the entrance. The latter effect may cause problems that the injured bee may not work hard and/or collect less pollen or may shorten its life, thereby reducing the amount of pollen collected in the end.

According to the present invention, an improvement is provided for the entrance to the beehive which makes use of the bee's habit for the entrance and includes a series of specifically shaped entrances through which the bee passes swiftly and safely. The entrances of the present invention make is possible for the bee to pass swiftly through without receiving any wound or injury around the wings, abdomen and legs and the pollen attached around the legs of the bee is efficiently removed so that good collection of the pollen is achieved.

In accordance with the invention, this is accomplished by providing an entranceway for the beehive shaped with a narrow portion through which the legs of the bee can pass and a wider upper portion through which the body and wings of the bee can safely pass. The pollen is removed from the legs of the bee by the narrow part of the entranceway.

Further, the detailed explanation of the present invention is illustrated, in accordance with the accompanying drawings, as followings, in which.

Figure 1:
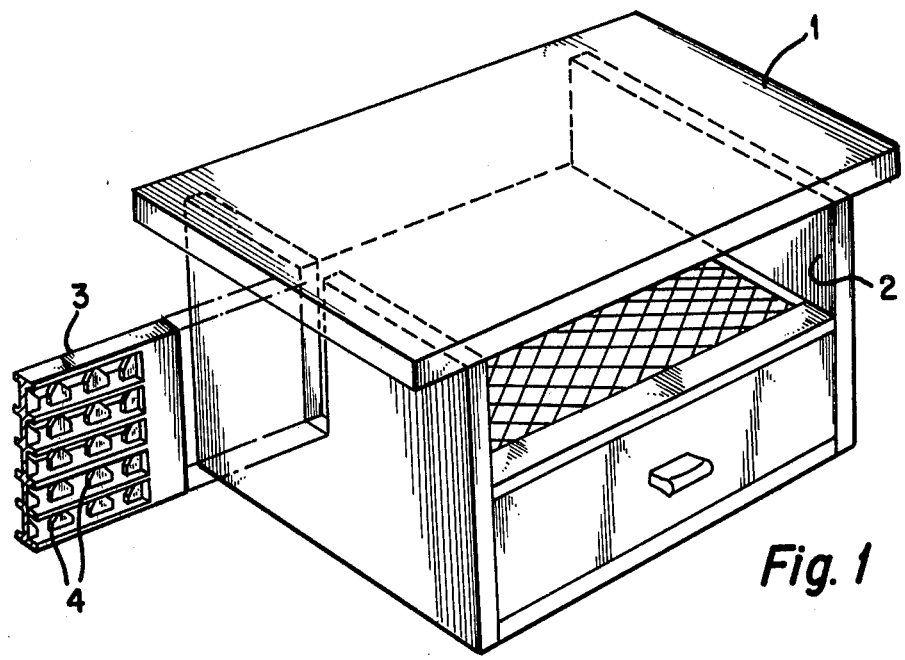
FIG. 1 is a perspective illustration of the present device, especially pointing out a part of the entrance; the characteristic feature of the present invention.

Referring to the drawings, the pollen collector 1 contains the specific entrance 4 located on a screen plate 3 which is adapted to be placed at the bee inlet 2 to the hive. The entrance 4 is formed of any suitable material, for example, plastic, wood, metal, fabric, etc.

Figure 2:
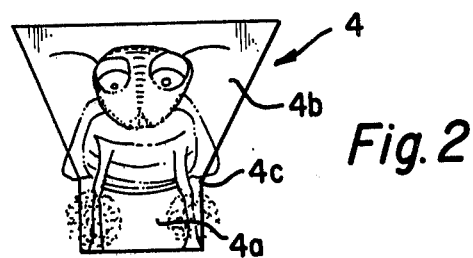
FIG. 2 is a view of the entrance showing the bee posing to enter into the beehive.

The preferred embodiment of the entrance 4 is shaped to form a conically widened space on the upper part and a generally square narrow space 4a on the lower part with substantially vertical side walls. The conically widened space 4b on the upper part is a space through which the body of the bee passes and the narrow space on the lower part is a space through which the legs of the bee pass. This is shown in FIG. 2.

When the bee passes through the entrance 4, since the body of the bee passes through the conically wider space 4b, the body or wings of the bee will not be wounded or injured. On the other hand, since the legs of the bee pass through the narrow space 4a, the pollen attached to the legs of the bee falls down around the entrance 4 where it can be collected in the bottom of the drawer of the hive because the legs having the pollen are touched by both sides of the narrow space 4a during the passage.

According to the present invention, it is possible to form the functure 4c of the upper conical space 4b and the square bottom space 4a with an arc-shape. Thus, by using such a form, the abdomen of the bee may not be scratched or injured when the bee passes through the entrance 4.

Figure 3:
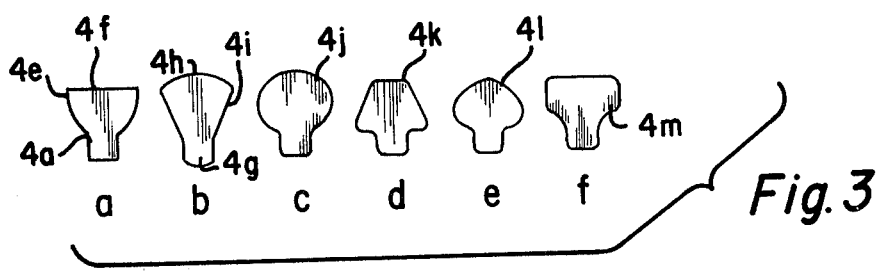
FIGS. 3a–3f are views of other forms of the entrance.

As explained above, the preferred embodiment of the invention has the entrance 4 of a specific shape in a form containing a conically widening space on the upper part and a substantially square narrow space on the lower part. However, in accordance with the habit or kinds of bee, it is possible to selectively change the entrance 4 to one of the examples illustrated in detail in FIG. 3.

For example, in FIG. 3a, the bottom part of the entrance has vertical side walls at the lower portion to define a substantially square space and arcuate shaped walls 4e on the upper portion with a horizontal top wall 4f. in FIG. 3b, the bottom 4g is somewhat arcuate with the top 4h arcuate in the opposite direction and the top side walls 4i extending outwardly forming a generally fan-shaped upper opening. In FIG. 3c, the upper part of the opening 4j is generally circular; in FIG. 3d, the upper space 4k is generally keystone shaped; in FIG. 3e, it is generally a spade shaped space 4l; in FIG. 3f, the junction 4m between the upper and lower sections is inwardly curved and the upper section is generally rectangular.

According to the present invention, when the bee passes the entrance, since the entrance contains a shape forming a wider upper space through which the abdomen and wings of the bee may pass freely or even if the abdomen and/or wings may be touched with the inner circumference of the entrance, the bee may pass easily the entrance by a slight touching. The bee will not receive any wound or resistance during the passage and the swift passage may bring a good working effect. On the other hand, since the pollen attached to the legs is removed by touching with the both sides of the narrow space in the lower part, it is possible to gather the pollen from the bee more effectively.

What is claimed is:

1. A device for gathering pollen from bees entering a beehive comprising a pollen collecting screen having a plurality of entrances for passage of said bees therethrough each of said entrances having a wider upper section through which the body of the bee is to pass and a substantially square narrow lower section through which the legs of the bees pass to be contacted by the portion of the screen forming said narrow section to remove the pollen from the legs of the bee.

2. A device as in either of claims 1 wherein the upper section is generally conical.

3. A device as in claim 1 wherein the walls of the upper section are generally arcuate.

4. A device as in claim 1 wherein the upper section has walls which widen outwardly from the bottom sections.

5. A device as in claim 4 wherein the top of the upper section is arcuate.

6. A device as in claim 1 wherein the upper section is partly circular.

7. A device as in claim 1 wherein the upper section is generally keystone shaped.

8. A device as in claim 1 wherein the upper section is generally spade shaped.

9. A device as in claim 1 wherein both said upper and lower sections are generally rectangular and the juncture between the two sections is inwardly arcuate.

* * * * *